Dec. 22, 1970  H. A. RASCHKE  3,548,412
FACE SHIELD MOUNTING BRACKETS FOR HELMETS WITH CURVILINEAR RIMS
Filed July 14, 1969

INVENTOR.
HERBERT A. RASCHKE
BY
Townsend and Townsend
ATTORNEYS

United States Patent Office 3,548,412
Patented Dec. 22, 1970

3,548,412
FACE SHIELD MOUNTING BRACKETS FOR HELMETS WITH CURVILINEAR RIMS
Herbert A. Raschke, Greenbrae, Calif., assignor to E. D. Bullard Company, Sausalito, Calif.
Filed July 14, 1969, Ser. No. 841,535
Int. Cl. A42b 1/00
U.S. Cl. 2—10                                                        1 Claim

ABSTRACT OF THE DISCLOSURE

A bracket adapted for removable attachment onto a rigid head protective helmet, which bracket permits a transparent face shield to be installed on the front of the helmet. A bracket that is specially configured to accommodate helmets in which the rim surrounding the visor portion of the helmet lies at an elevation higher than the rim at the remaining portions of the helmet. The bracket is also adaptable for installation on helmets having substantially straight or linear rims.

---

This invention relates to a bracket for safety helmet attachments and more particularly to such bracket that can be installed with equal facility onto helmets having curvilinear rims and helmets having substantially straight rims.

Brackets of the type that embody the present invention include a U-shaped member that generally conforms to the shape of the front portion of the helmet rim and define a groove or slot into which the rim is received. Means, such as a spring for circumscribing the rear region of the helmet, are provided for securing the bracket onto the helmet rim. The bracket includes a pair of pivotal connections adjacent the sides of the helmet, which pivotal connections mount a transparent face shield which, when in the lowered position, protects the face and neck of the wearer against injury. A secure fit between the U-shaped member and the helmet rim depends in a large part upon the degree to which the shape of the U-shaped member conforms to the shape of the rim. Many helmets have a front visor portion that resides at an elevation above the remaining parts of the rim so as to afford unobstructed vision to the wearer of the helmet. Such irregular or curvilinear rims render difficult the provision of a tight fit between the U-shaped member and the helmet rim.

The present invention provides a U-shaped member having appropriately excised portions opposite the transition regions between the rim of the visor and the remainder of the rim which is at a somewhat lower level than the visor rim. Accordingly, the visor rim fits into the previously mentioned groove in the bracket, whereas the remaining part of the rim resides outside of the groove, since the transition portion of the rim and the excised portion are in alignment. The excised portion does not in any way adversely affect the utility of the U-shaped bracket in connection with helmets having straight or linear rims.

For portions of the essential disclosure in the present specification, U.S. Pat. No. 3,114,914 is expressly incorporated hereinto by this reference; such patent discloses a face shield mounting bracket that has found significant utility for mounting face shields onto helmets with straight or linear rims.

The principal object of the present invention is to provide a face shield mounting bracket which is equally adaptable to helmets with straight rims and to helmets with curvilinear rims.

Figure 1:
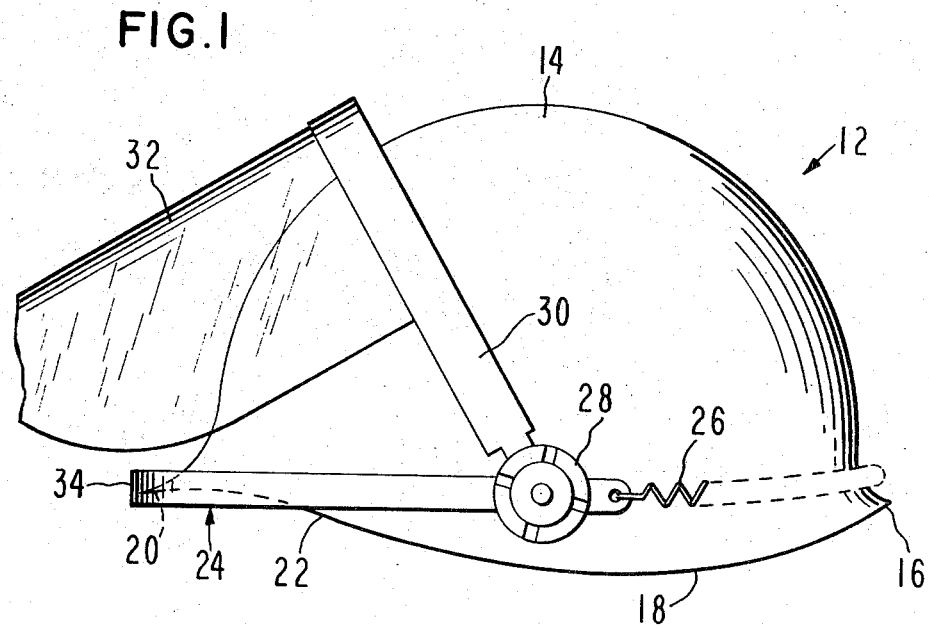
Figure 2:
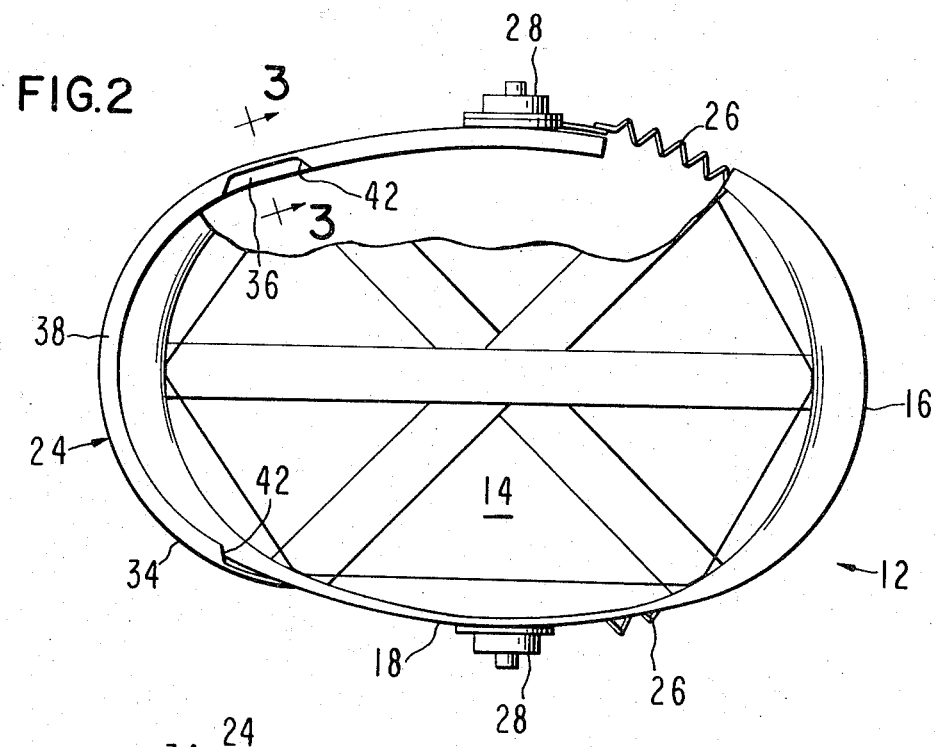
Figure 3:
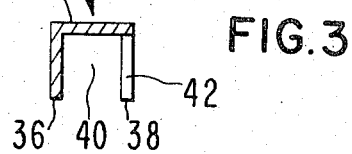

The foregoing together with other objects, features and advantages will be more apparent after referring to the following specification and accompanying drawing in which:

FIG. 1 is a side view of a helmet and a face shield mounting bracket embodying the present invention;
FIG. 2 is a bottom view of the structure of FIG. 1 with portions being broken away for clarity; and
FIG. 3 is a cross-sectional view at enlarged scale taken along line 3—3 of FIG. 2.

Referring more particularly to the drawing, reference numeral 12 indicates a helmet made of rigid protective material; the specific helmet shown in the drawing is the steel helmet employed by the United States Army and by diverse law enforcement and National Guard groups. Such helmets are constructed of steel and include a crown portion 14 that terminates above the rear of the wearer's head in a rim portion 16 and terminates at the sides of the wearer's head in a rim portion 18. The helmet includes a forwardly extending visor 20, the lower rim of which resides at a level above side rim portion 18, and a transition region 22 exists between the visor and the side portion of the helmet to effect a smooth discontinuity-free transition from the relatively high visor to the relatively low side portion.

The face shield mounting bracket is formed by a U-shaped member 24 that has a curvature approximating that of the rim of the visor 20 (see FIG. 2). At the rearward extremities of U-shaped member 24 are fastened the ends of a coil spring 26 which circumscribes the rear of the helmet above rim portions 16 and 18 to retain the U-shaped member onto the visor rim. Also, located adjacent the rear extremities of U-shaped member 24 are pivot fasteners 28 which support a second U-shaped member 30 for movement about the axis of the pivot. U-shaped memebr 30 supports a transparent face shield 32 which, when in the lowered position, is approximately vertical and protects the face of the wearer of the device.

U-shaped member 24 includes a central vertical web 34 (see FIG. 3) and upper and lower flanges 36 and 38, respectively. Between the flanges is formed a groove 40 that receives the rim of visor 20 therein to retain the U-shaped member in position on the helmet. In alignment with transition portions 22 of the helmet rim are excisions 42 formed in lower flange 38. The excisions 42 have a circumferential extent sufficient that the portion of U-shaped member 24 forward of the excision snugly embraces the rim of visor 20, and the portion of the U-shaped member rearward of the excision resides above side rim portion 18. Accordingly, U-shaped member 24 is substantially straight or linear when viewed in the vertical position of FIG. 1 so as to adapt the mounting bracket to other helmets having straight rims in addition to the helmet specifically shown in FIG. 1.

Thus, it will be seen that the present invention provides a face shield mounting bracket which achieves all of the purposes afforded by the structure shown in the aforesaid patent, No. 3,114,914, while additionally permitting face shields to be secured to helmets having curvilinear rims. Accordingly, the present invention materially improves the utility of the bracket without significantly increasing the production cost thereof.

Although one embodiment of the invention has been shown and described, it will be obvious that other adaptations and modifications can be made without departing from the true spirit and scope of the invention.

What is claimed is:
1. A bracket for securing a face shield onto a head protective helmet of the type having a rigid crown terminating at a rim at a level of the lower portion of the back and sides of the wearer's head, the helmet having a forwardly extending visor terminating in a rim at the front at a level higher than the rim at the back and sides to afford unobstructed vision, the portion of said rim between the visor and the sides being formed by a smooth, discon- tinuity-free transition region, said bracket comprising a U-shaped member shaped generally similar to the visor rim and having a central vertical web and upper and lower flanges extending from the web to define a continuous groove extending the full length of said bracket for receiving the rim, means for securing the U-shaped member onto the helmet, means for pivotally securing a transparent face protective shield to the U-shaped member at points aligned with the temples of the head of the wearer, a portion of the lower flange of the U-shaped member being excised at the transition region of the rim so that the visor rim between the transition regions is received in the portion of said groove between said excised portions with said transition regions passing through said excised portions of said lower flange whereby the extremities of the U-shaped member lie above the rim at the sides of the helmet when the bracket is in place on the helmet.

References Cited

UNITED STATES PATENTS

| | | | |
|---|---|---|---|
| 2,846,683 | 8/1958 | Dye et al. | 2—3 |
| 3,114,914 | 12/1963 | Ruggiero | 2—8 |

FOREIGN PATENTS 1,096,543  6/1955  France.

H. HAMPTON HUNTER, Primary Examiner